US005238996A

United States Patent [19]

Otake et al.

[11] Patent Number: 5,238,996

[45] Date of Patent: Aug. 24, 1993

[54] BINDER RESIN FOR A HEAT TRANSFER LAYER AND HEAT TRANSFER INK RIBBON

[75] Inventors: Hirohisa Otake; Satoshi Ozai; Akio Nishijima, all of Shibukawa, Japan

[73] Assignees: Denki Kagaku Kogyo Kabushiki Kaisha; Sony Corporation, Tokyo, Japan

[21] Appl. No.: 821,173

[22] Filed: Jan. 16, 1992

[30] Foreign Application Priority Data

Jan. 16, 1991 [JP] Japan .................................. 3-014913

[51] Int. Cl.[5] .......................... C08F 8/00; C08G 63/91

[52] U.S. Cl. .......................................... 525/61; 525/56

[58] Field of Search .................................... 525/56, 61

[56] References Cited

U.S. PATENT DOCUMENTS 5,068,282 11/1991 Kanto et al. .......................... 525/61

FOREIGN PATENT DOCUMENTS 0271861 6/1988 European Pat. Off. .

OTHER PUBLICATIONS

Patent Abstracts of Japan, vol. 14, No. 237 (M-976) [4180], May 21, 1990, N. Takahashi, et al., "Binder For Thermosensitive Recording Medium", & JP-A--2-63788, Mar. 5, 1990.

*Primary Examiner*—Paul R. Michl
*Assistant Examiner*—LaVonda DeWitt
*Attorney, Agent, or Firm*—Oblon, Spivak, McClelland, Maier & Neustadt

[57] ABSTRACT

A binder resin for a heat transfer layer, which consists essentially of a polyvinyl acetacetal resin (I) having an acetacetalation degree of at least 87% by weight, the weight ratio of cis-vinyl acetacetal moiety/trans-vinyl acetacetal moiety in the acetacetal moiety of the resin (I) being from 1 to 4.

5 Claims, 2 Drawing Sheets

BINDER RESIN FOR A HEAT TRANSFER LAYER AND HEAT TRANSFER INK RIBBON

The present invention relates to a binder resin for a heat transfer layer and a heat transfer ink ribbon having a heat transfer layer containing such a resin as a binder.

Heretofore, image recording by a sublimation heat transfer system has been conducted by means of an ink ribbon and a record paper. More specifically, image recording is conducted in such a manner that an ink ribbon having a heat transfer layer containing a sublimation dye, a binder, etc. on a substrate and a record paper having a dye receiving layer on a base sheet are put together so that the heat transfer layer side of the ink ribbon and the dye receiving layer side of the record paper are in contact with each other, a thermal energy is imparted to the above ink ribbon by a thermal head or a laser under temperature control on the basis of image signal, so that the dye in the heat transfer layer will sublime, and the dye sublimed from the heat transfer layer will be transferred to the dye receiving layer of the above record paper.

In this sublimation heat transfer system, the quantity of the heat energy imparted to the heat transfer layer of the ink ribbon is changed in response to the change of the image signal obtained by a television, a CRT color display, a color facsimile or a magnetic camera, so that the amount of the dye sublimed and transferred from the heat transfer layer will accordingly be changed, whereby it is possible to obtain an image record having an excellent gradation or tone on the dye receiving layer of the record paper. Further, full color image recording can be conducted by using three types of ink ribbons which contain in their heat transfer layers three primary colors of yellow, magenta and cyan, respectively, in such a manner that the respective colors will be transferred one after another to the same dye receiving layer side of a record paper at the time of heat transfer.

However, heat transfer layers of ink ribbons used in conventional sublimation heat transfer methods have problems with respect to the storage stability or the recording density in many cases. Namely, conventional ink ribbons are likely to undergo bleeding or crystallization of dyes contained in their heat transfer layers and thus have poor storage stability, which used to be causes for lowering the recording density or for forming irregularities in the recording density. In order to prevent such bleeding or crystallization of dyes, a method has been attempted in which an ester-type resin or an amino-type resin having good compatibility with the dye is used as a binder for the heat transfer layer (Japanese Unexamined Patent Publications No. 34191/1988 and No. 188193/1986). By these methods, the storage stability can be improved. However, when the heat transfer layer is heated, the dye tends to hardly sublime and vaporize, whereby there is a problem that no adequate recording density is obtainable.

Further, a method has recently been proposed in which a certain specific polyvinyl acetacetal resin is used as a binder for the heat transfer layer (Japanese Unexamined Patent Publication No. 151484/1988). However, even by this method, no adequate improvement has been attained with respect to the storage stability of the ink ribbon and the recording density.

The polyvinyl acetacetal resin used in the above method is obtained by a so-called water medium method wherein acetaldehyde and an acid catalyst are added to an aqueous solution of polyvinyl alcohol for an acetacetalation reaction, whereby the resin precipitates in the aqueous reaction system as the reaction proceeds.

However, by this water-medium method, the resin gradually precipitates as the reaction proceeds, and after the initiation of the precipitation, the acetalation reaction of polyvinyl alcohol by acetaldehyde tends to hardly proceed, whereby it is difficult to obtain a polyvinyl acetacetal resin having a high acetacetalation degree at a level of at least 87% by weight.

The present inventors have conducted various studies to solve such problems and as a result, have found it possible to obtain a heat transfer ink ribbon excellent in both the storage stability and the recording density by using a polyvinyl acetacetal resin having a high acetacetalation degree and a certain specific ratio of steric isomer structures. The present invention has been accomplished on the basis of this discovery.

Thus, the present invention provides a binder resin for a heat transfer layer, which consists essentially of a polyvinyl acetacetal resin (I) having an acetacetalation degree of at least 87% by weight, the weight ratio of cis-vinyl acetacetal moiety/trans-vinyl acetacetal moiety in the acetacetal moiety of the resin (I) being from 1 to 4.

The present invention also provides a heat transfer ink ribbon comprising a substrate and a heat transfer layer formed on the substrate, wherein the heat transfer layer contains a sublimable dye and the above-mentioned binder resin for a heat transfer layer.

In the accompanying drawings.

Figure 1:
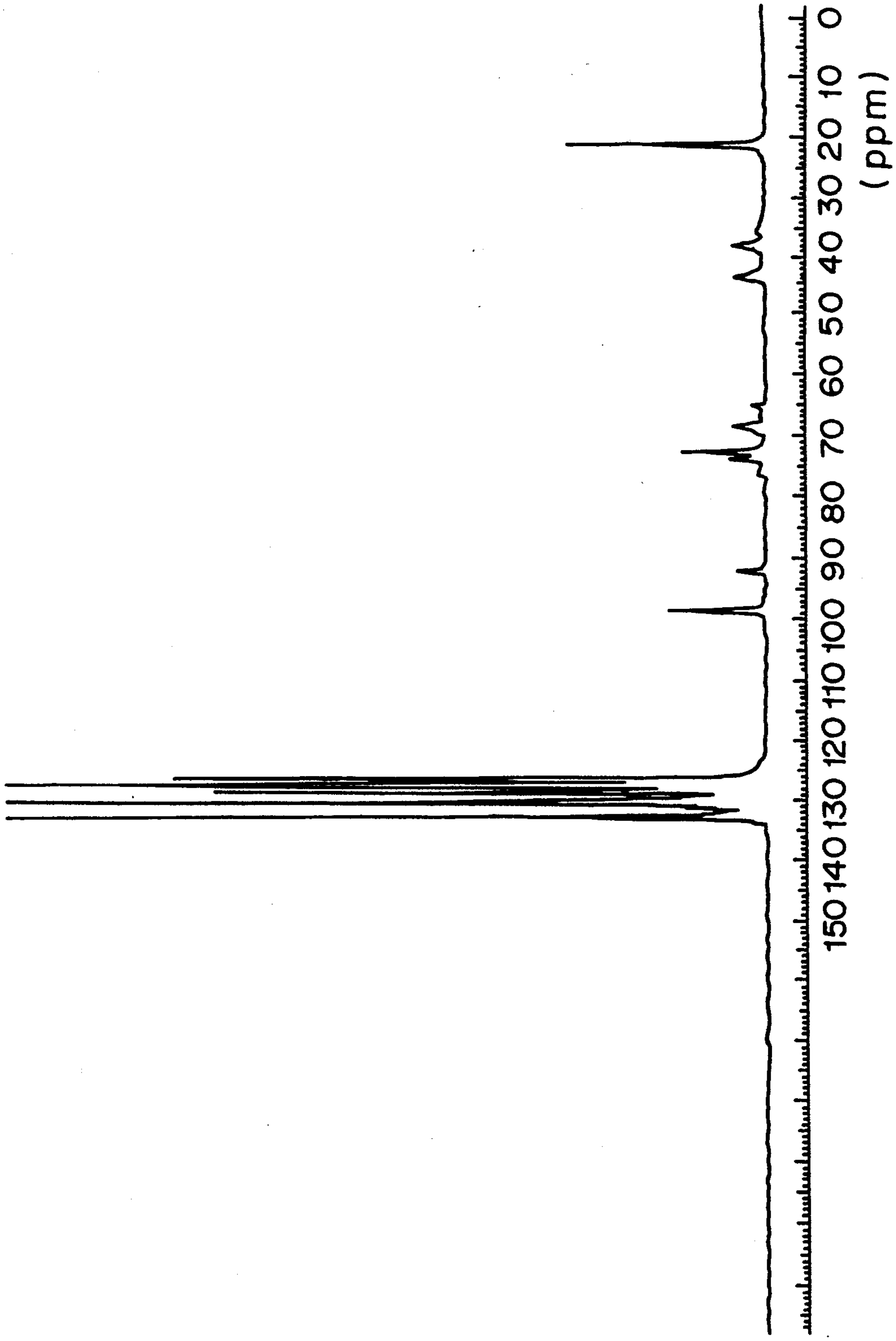
FIG. 1 is a $^{13}C$-NMR spectrum of the polyvinyl acetacetal resin of Example 1.

Now, the present invention will be described in detail.

Firstly, the binder resin for a heat transfer layer of the present invention will be described.

The binder resin (I) to be used as the binder resin for a heat transfer layer of the present invention is a polyvinyl acetacetal resin which is highly acetacetalated with an acetacetalation degree of at least 87% by weight, preferably at least 89% by weight. If the acetacetal units in the resin are less than 87% by weight, the recording density of the image sometimes tends to be low.

Moieties other than the acetacetalated moieties of the polyvinyl acetacetal resin (I) of the present invention, include an unreacted vinyl alcohol unit moiety and a fatty acid vinyl ester unit moiety derived from the starting material polyvinyl alcohol resin (hereinafter referred to simply as PVA). Further, when the starting material PVA is a saponification product of a copolymer of a fatty acid vinyl ester with other monomer copolymerizable with the fatty acid vinyl ester, or it is a post-modified product of PVA, the moieties other than the acetacetalated moieties, include, in addition to the above two types of unit moieties, unit moieties derived from such a copolymerized other monomer or from such post-modification.

The vinyl alcohol unit moiety is usually at most 12% by weight, preferably from 5 to 10% by weight. The fatty acid vinyl ester unit moiety may be present in a small amount at a level of at most 3% by weight. Further, the above-mentioned unit moieties derived from the copolymerized other monomer and from the post-modification are usually at most 8% by weight, preferably at most 5% by weight.

There is no particular restriction as to the average degree of polymerization of the polyvinyl acetacetal resin (I) to be used in the present invention. However, it is usually preferably within a range of from 200 to 4,000, particularly from 300 to 3,000. If the average degree of polymerization is less than 200, the force to maintain the shape of the heat transfer layer and to fix the heat transfer layer to the substrate of the ink ribbon tends to be weak. On the other hand, if it exceeds 4,000, the solubility in an organic solvent tends to be low, or the viscosity of the reaction solution at the time of the acetalation reaction tends to be high, whereby it will be required to reduce the concentration of the reaction system, and the productivity of the resin tends to be low.

In the polyvinyl acetacetal resin (I) to be used as the binder resin for a heat transfer layer of the present invention, the acetacetalated moiety comprises acetacetal moieties having two types of steric isomer structures i.e. a cis-vinyl acetacetal moiety (hereinafter referred to as a cis acetal moiety) and a trans-vinyl acetacetal moiety (hereinafter referred to as a trans acetal moiety). The weight ratio of the cis acetal moiety/trans acetal moiety of the polyvinyl acetacetal resin, is from 1 to 4, preferably from 1 to 3. If the weight ratio is outside the range of from 1 to 4, the storage stability and the recording density tend to be low, such being undesirable.

The measurement of the above weight ratio of the cis acetal moiety to the trans acetal moiety can be conducted by a nuclear magnetic resonance (NMR) spectrum. For example, a signal of CH group containing in the cis acetal moiety is detected in the vicinity of 98 ppm on the $^{13}$C-NMR spectrum, and a signal of CH group contained in the trans acetal moiety is detected in the vicinity of 92 ppm. The difference between the respective signals corresponds to the difference in the content of the respective CH groups. Therefore, the weight ratio of the cis acetal moiety to the trans acetal moiety in the acetacetal moiety may be represented by the signal ratio i.e. the area ratio in the $^{13}$C-NMR spectrum.

Figure 2:
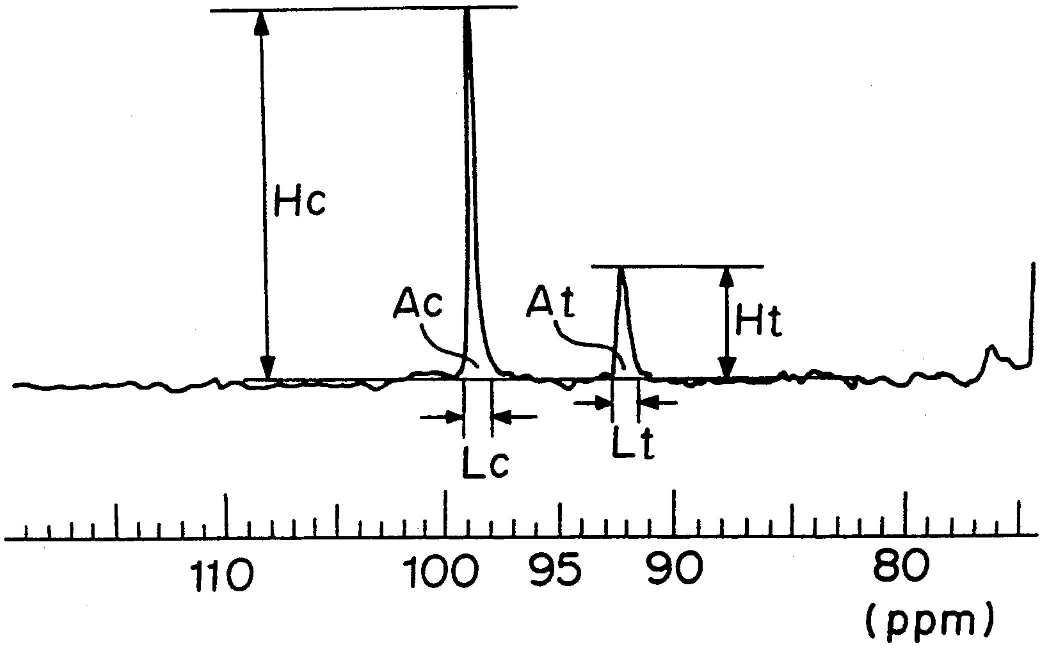
FIG. 2 is a partially enlarged view of the $^{13}C$-NMR spectrum of the polyvinyl acetacetal resin of Example 1 in FIG. 1.

Now, a specific method for determining the above weight ratio will be described. FIG. 2 is a partially enlarged view of the $^{13}$C-NMR spectrum of the polyvinyl acetacetal resin of Example 1 of the present invention. In this FIG. 2, the weight ratio of the cis acetal moiety/trans acetal moiety is represented by an area ratio of the cis signal to the trans signal. Specifically, when each signal is regarded as a triangle, the height of the signal is regarded as H and the length of the bottom side is regarded as L, Cis signal area: $Ac = \frac{1}{2} \cdot Hc \cdot Lc$ Trans signal area: $At = \frac{1}{2} \cdot Ht \cdot Lt$ Thus, cis acetal moiety/trans acetal moiety $= Ac/At = Hc \cdot Lc/Ht \cdot Lt$.

Now, a method for producing a polyvinyl acetacetal resin (I) to be used in the present invention, will be described.

The polyvinyl acetacetal resin (I) to be used as the binder resin for a heat transfer layer in the present invention, can be obtained by conducting an acetacetalation reaction of PVA with acetaldehyde under a specific reaction condition.

As a method for acetacetalation of PVA, there has been known a solvent method wherein PVA in a powder form is dispersed in an organic solvent such as an alcohol or a water-containing alcohol, and then acetaldehyde is added in the presence of an acid catalyst such as hydrochloric acid or sulfuric acid to conduct the acetacetalation reaction to obtain a polyvinyl acetacetal solution, a uniform method wherein acetaldehyde and an acid catalyst are added to an aqueous PVA solution to conduct the acetacetalation reaction, and an organic solvent is added in accordance with the progress of the reaction so that the reaction system is maintained to be uniform, or a water-medium method wherein acetaldehyde and an acid catalyst are added to an aqueous PVA solution to conduct the acetacetalation reaction, whereby the polyvinyl acetacetal will precipitate as the reaction proceeds. To obtain the polyvinyl acetacetal resin having a high acetacetalation degree to be used in the present invention, the solvent method and the uniform method are preferred. Among them, the solvent method is most preferred since it is economically advantageous without a step of solubilizing PVA in water.

The polyvinyl acetacetal resin (I) for the present invention can be obtained, for example, by conducting an acetalation reaction using acetaldehyde in a large amount to PVA and an acid catalyst in a predetermined amount so that the reaction proceeds to attain a desired acetacetalation degree of at least 87% by weight in a reaction time within 10 hours, and then terminating the reaction.

Specifically, it can be produced, for example, by conducting the acetacetalation reaction for from 3 to 10 hours in a system comprising 100 parts by weight of PVA, from 120 to 500 parts by weight of acetaldehyde, from 1 to 7 parts by weight of an acid catalyst (pure content) and a medium.

There is no particular restriction as to starting material PVA to be used. PVA may be selected for use within a wide range. For example, it may be PVA obtained by completely or partially saponifying a polymer of one or more fatty acid vinyl esters such as vinyl acetate, vinyl formate and vinyl propionate. Further, a saponification product of a copolymer obtained by copolymerizing a fatty acid vinyl ester with other monomer copolymerizable therewith to such an extent not to adversely affect the present invention, or a post-modified product obtainable by post-modifying PVA, may also be used as starting material PVA. Furthermore, starting material PVA to be used may be a combination of at least two types of PVA differing in the average polymerization degree, the saponification degree or the constituting units. From the economical viewpoint, it is preferred to use a PVA polymer obtainable by saponifying a vinyl acetate polymer.

There is no particular restriction as to starting material acetaldehyde. Usual acetaldehyde may be employed without any particular restriction as to the quality. A product of industrial grade is sufficient.

Acetaldehyde is used usually in an amount within a range of from 120 to 500 parts by weight, preferably from 200 to 350 parts by weight, per 100 parts by weight of PVA. If the amount is less than 120 parts by weight, it tends to be difficult to obtain a product having an acetacetalation degree of at least 87% by weight since the amount of acetaldehyde is too small. On the other hand, if it exceeds 500 parts by weight, the reaction rate increases so much that it tends to be difficult to control the weight ratio of the cis acetal moiety/trans acetal moiety and the acetacetalation degree, whereby it tends to be difficult to obtain a polyvinyl acetacetal resin having desired properties.

The acetacetalation reaction is conducted in the presence of an acid catalyst. As the acid catalyst, an inorganic acid is employed. For example, hydrochloric acid, sulfuric acid and nitric acid may be mentioned. Among them, hydrochloric acid is preferred.

The acid catalyst is used usually in an amount within a range of from 1 to 7 parts by weight, preferably from 3 to 6 parts by weight, as pure content, per 100 parts by weight of PVA. If the amount is less than 1 part by weight, the acetacetalation reaction rate tends to be low, and it tends to be difficult to obtain a resin having a desired acetacetalation degree. On the other hand, if it exceeds 7 parts by weight, the reaction rate tends to be high, and it tends to be difficult to obtain a resin having a desired weight ratio of the cis acetal moiety/trans acetal moiety and a desired acetacetalation degree.

The acetacetalation reaction is conducted in a medium. As the medium, organic solvents such as alcohols, esters, ketones and aromatic solvents may be used alone or in combination of two or more of them. Such an organic solvent may contain not more than about 15% by weight of water.

The proportion of the medium to be used varies depending upon the method of the acetacetalation reaction to be employed, the medium to be used or the average degree of polymerization of PVA. However, it is usually from 250 to 5,000 parts by weight, preferably from 300 to 2,500 parts by weight, more preferably from 400 to 700 parts by weight, per 100 parts by weight of PVA.

In the present invention, the reaction time is usually from 3 to 10 hours, preferably from 5 to 7 hours. If the reaction time is less than 3 hours, the reaction tends to be inadequate, whereby not only it tends to be difficult to obtain a resin having a desired acetacetalation degree, but also the acetacetalation degree of PVA in the acetacetalation reaction system tends to be non-uniform, such being undesirable. On the other hand, if it exceeds 10 hours, the weight ratio of the cis acetal moiety/trans acetal moiety tends to change and tends to be outside of the weight ratio of from 1 to 4.

Here, the reaction time for the acetacetalation is the period starting from the time when three materials of PVA, acetaldehyde and an acid catalyst have started to coexist in the reaction system to the time when the acid catalyst in the reaction system is neutralized to terminate the acetacetalation reaction, so that the function as the catalyst has extinguished. For the neutralization of the acid catalyst, a hydroxide of e.g. an alkali metal or an alkaline earth metal, may be employed. However, such a hydroxide forms a salt by neutralization, and if the salt is taken into the resin, the electrical characteristics of the resin or the transparency of the organic solvent solution of the resin tends to decrease. In order to prevent such a problem, it is preferred to use an epoxide such as ethylene oxide, propylene oxide or butylene oxide, as the neutralizing agent. Such an epoxide is preferably added in an amount of at least two mols per mol of the acid catalyst for the neutralization of the acid catalyst.

The reaction temperature (liquid temperature) for the acetacetalation is not particularly limited and may be selected in accordance with the desired reaction rate such that a high temperature is employed when a quick reaction rate is required. It is usually preferred to employ a temperature within a range of from 20° to 70° C., more preferably from 40° to 65° C.

The reaction solution or slurry after completion of the reaction by neutralizing the acid catalyst, may be subjected to a step of e.g. precipitation, washing with water, filtration or drying, as the case requires, to obtain a polyvinyl acetacetal resin in a powder form.

No special apparatus is required to obtain a polyvinyl acetacetal resin by conducting the above acetacetalation reaction. A conventional apparatus used for the preparation of a polyvinyl acetal resin, may be employed.

In the manner as described above, it is possible to obtain a highly acetacetalated polyvinyl acetacetal resin (I) which has an acetacetalation degree of at least 87% by weight and a weight ratio of the cis acetal moiety/trans acetal moiety in the acetacetal moiety within a range of from 1 to 4.

Further, to the binder resin for a heat transfer layer of the present invention, a carboxy-modified polyvinyl acetacetal (resin (II)), a carboxy-modified polyvinyl acetal having acetacetal and butyl acetal repeating units (resin (III)), a polyvinyl acetal having acetacetal and butyl acetal repeating units, a polyvinyl acetal having formacetal, acetacetal and butyl acetal repeating units, a polyvinyl butyl acetal, or a resin composed of a combination thereof, may be incorporated. These resins may be incorporated usually in an amount of at most 30% by weight, preferably at most 15% by weight, to the resin (I).

Among these resins, resin (II) and resin (III) are preferred, since the storage stability of the heat transfer layer can be improved without substantially reducing the properties for the recording density of the heat transfer layer by a combined use of resin (I) with one or both of resins (II) and (III).

Carboxyl groups contained in the above resins (II) and (III) may be partially or wholly in the form of an acid (—COOH), a salt (salt of e.g. sodium, potassium, lithium, ammonia or an amine), a lower alkyl (such as methyl, ethyl, propyl or butyl) ester, an acid amide or a combination thereof. It is preferred that at least part of carboxyl groups is in the form of an acid, since the dye dispersibility at the time of obtaining a dye composition by mixing in an organic solvent a dye and a binder used to form a heat transfer layer and the fixing properties of the heat transfer layer to the substrate, will thereby be improved.

The amount of carboxyl groups contained in the above resin (II) or (III) is represented by the weight % of the carboxyl groups (calculated as COOH) based on such a resin. Likewise, the amount of carboxyl groups in the case where the resins (II) and (III) are co-existent, is represented by the weight % of the carboxyl groups based on the mixture of such resins. The amount is preferably from 0.5 to 9% by weight, more preferably from 2 to 5% by weight, in any case, in order to improve the storage stability of the heat transfer layer and to avoid coagulation of the dye when the dye and an organic solvent solution of such resins are mixed.

The content of carboxyl groups (COOH) in resin (II) or (III) is represented by a value obtained by converting carboxyl groups to sodium salts, quantitatively analyzing the sodium by means of an atomic absorption photometer, and converting the value thereby obtained to a value of carboxyl groups.

The acetalation degree (the proportion of vinyl acetal units) of resin (II) or (III) is preferably at least 65% by weight for each resin from the viewpoint of the solubility in an organic solvent. A preferred range of the average degree of polymerization of resin (II) or (III) is from 200 to 4,000, more preferably from 250 to 3,000, from the viewpoint of the fixing properties of the heat transfer layer, the solubility of the resin in the organic solvent, or the productivity.

The above resin (II) or (III) is obtainable by subjecting a carboxy-modified PVA to an acetalation reaction in the presence of an acid catalyst using one or two types of aldehydes. Namely, when acetaldehyde is employed as the aldehyde, resin (II) is obtainable. Likewise, when acetaldehyde and butyl aldehyde are used in combination, resin (III) can be obtained.

The above carboxy-modified PVA can be obtained by a conventional method. Specifically, it can be obtained by a method of saponifying a copolymer of a fatty acid vinyl ester (such as vinyl acetate, vinyl propionate or vinyl formate) with one or more of unsaturated monocarboxylic acid (such as acrylic acid, methacrylic acid and crotonic acid), ethylenically unsaturated dicarboxylic acids (such as maleic acid, fumaric acid and itaconic acid), ethylenically unsaturated dicarboxylic acid anhydrides (such as maleic anhydride), (meth)acrylic acid alkyl esters (such as methyl (meth)acrylate, ethyl (meth) acrylate, butyl (meth)acrylate and ethylhexyl (meth)acrylate), (meth)acrylnitriles and (meth)acrylamides.

Further, a carboxy-modified PVA can be obtained also by saponifying a copolymer of a fatty acid vinyl ester with one or more monomers having side chains which react with an acid used as the catalyst for the acetalation reaction and thus are converted to carboxyl groups (such as acrylamide or methacrylamide).

Furthermore, a post-modified PVA such as a carboxymethylated PVA obtained by reacting hydroxyl groups of PVA with monochloroacetic acid in the presence of a catalyst, may be used as a carboxy-modified PVA to obtain resin (II) or (III).

The carboxyl groups in the carboxy-modified PVA may be in the form of e.g. an acid, salt, acid amide or alkyl ester, or in the form of a mixture thereof. Further, two or more carboxy-modified PVA differing in the proportion of carboxyl groups contained, in the structure of carboxy units, in the form of the carboxyl groups, in the average degree of polymerization or in the saponification degree, may be used in combination.

Now, a heat transfer ink ribbon having a heat transfer layer formed on a substrate using a binder resin for a heat transfer layer of the present invention which consists essentially of the above polyvinyl acetacetal resin (I), will be described.

The heat transfer ink ribbon of the present invention has a heat transfer layer containing a sublimable dye and the binder resin for a heat transfer layer, on the substrate. The binder resin for a heat transfer layer may be not only the above resin (I) but also a combination of resin (I) and the above described resin and/or resin (III). The total content of resin (I) and resin (II) and/or resin (III) in the heat transfer layer is preferably from 3 to 80% by weight, more preferably from 20 to 50% by weight, from the viewpoint of the storage stability and fixing properties of the heat transfer layer obtained, the dispersion stability of the dye in the dye composition and the recording density of the image thereby obtained. Further, the total weight of resin (I), resin (II) and/or resin (III) in the heat transfer layer is preferably from 3 to 200% by weight, more preferably from 50 to 150% by weight, based on the weight of the dye. The thickness (after drying) of the heat transfer layer to be formed on the substrate is usually at a level of from 0.5 to 5 μm.

The heat transfer layer containing the above-mentioned binder resin for a heat transfer layer, can be formed by coating on a substrate a dye composition having the sublimable dye, the binder resin for a heat transfer layer and various additives dissolved or dispersed in an organic solvent, followed by drying.

As the sublimable dye, a wide range of dyes may be employed without any particular restriction. For example, anthraquinone-type, azo-type and methine-type dyes may be mentioned. Various additives which may be used as the case requires, include releasing agents such as a silicon-type, fluorine-type and amide-type compounds, dispersing agents such as various surfactants, drying promoting agents such as cellulose derivatives, various defoaming agents and antistatic agents.

As the organic solvent, a lower alcohol, an ester, a ketone, an aromatic compound, an aliphatic hydrocarbon or a solvent mixture comprising at least two types of such organic solvents, may be used.

As the substrate, a wide range of materials may be employed without any particular restriction. For example, a polyester, polyamide, polyimide or triacetate film having a thickness of from 3 to 20 μm is preferably employed.

A heat transfer ink ribbon can be prepared by coating the above dye composition on a substrate by means of a conventional apparatus and method such as printing or coating, followed by drying to form a heat transfer layer.

Now, the present invention will be described in further detail with reference to Examples and Comparative Examples. However, it should be understood that the present invention is by no means restricted to such specific Examples. In the following, "parts" and "%" mean "parts by weight" and "% by weight", respectively, unless otherwise specified.

EXAMPLE 1

Preparation of a Polyvinyl Acetacetal Resin

Into a reactor equipped with a stirrer, a reflux condenser and a thermometer, 120 parts of methanol and 15 parts of 35% hydrochloric acid were charged, and 100 parts of PVA (average degree of polymerization: 2430, amount of residual vinyl acetate: 2.9%) was added under stirring. Then, 125 parts of acetaldehyde was added thereto, and the reaction was conducted at a temperature of 60° C. for 6 hours to obtain a methanol solution of a polyvinyl acetacetal. This solution was cooled and neutralized by ethylene oxide. Then, water was added thereto under stirring and a precipitation operation was conducted, followed by washing with water, filtration and drying to obtain a polyvinyl acetacetal resin as white powder.

The average composition of the resin thus obtained was 90.2% of an acetacetal moiety, 8.5% of a vinyl alcohol moiety and 1.3% of a vinyl acetate moiety, and the average degree of polymerization was 2,410. Further, the viscosity at 20° C. of a 5% solution having the resin dissolved in a solvent mixture comprising equal amounts of ethanol and toluene, was 158 centi poise. A $^{13}C$-NMR spectrum of the polyvinyl acetacetal resin thus obtained, is shown in FIG. 1. The weight ratio of the cis acetal moiety/trans acetal moiety as measured by NMR, was 2.7, and the glass transition temperature (Tg) was 113° C.

Measuring Methods (1) The measurements of the vinyl alcohol moiety, the vinyl acetate moiety and the acetacetal moiety of the polyvinyl acetacetal resin were conducted in accordance with JIS K-6728.

(2) The glass transition temperature (Tg) was measured by a differential thermal analyzer "SEIKO I SSC5000, DSC200" (the temperature rising rate: 10° C./min).

(3) The measurement of the $^{13}$C-NMR was conducted under the following conditions, and the weight ratio of the cis acetal moiety/trans acetal moiety of the acetacetal moiety was determined.

Apparatus: JEOL FX-90A (manufactured by Nippon Denshi K. K.)
Lock: $C_6D_6$
Mode: NNE
Ref.: ODCB (o-dichlorobenzene)
ACGTM: 1.6 sec
Concentration: 10 wt %
PD: 1.0 sec
Number of integration times: 40,000
Temperature: 100° C.

Preparation of an Ink Ribbon

A dye composition having the following blend composition was prepared by using the obtained polyvinyl acetacetal resin as a binder resin for the following dye composition.

Blend Composition of the Dye Composition

| | |
|---|---|
| Binder resin | 3 parts |
| Sublimable dye (Sumiplusred FB) | 5 parts |
| Methyl ethyl ketone | 62 parts |
| Toluene | 30 parts |

This dye composition was coated by wire bar coating on one side of a polyester film having a thickness of 6 μm so that the thickness after drying would be 1 μm, followed by drying to obtain an ink ribbon.

Preparation of a Record Paper

A record paper having a dye receiving layer on its surface was prepared in the following manner to evaluate the performance of the ink ribbon obtained as described above, by conducting heat transfer to the record paper. Namely, the record paper was prepared by coating a dye receiving layer-forming composition having the following blend composition by wire bar coating on one side of a propylene synthetic paper (Yupo FPG 150, manufactured by Oji Yuka Gohseishi K. K.) as a base sheet so that the coated layer thickness after drying would be 5 μm, followed by drying to form a dye receiving layer.

Blend Composition of the Dye Receiving Layer-forming Composition

| | |
|---|---|
| Saturated polyester resin (Byron #200, Toyo Boseki K.K.) | 10 Parts |
| Amino-modified silicone oil (KF-393, manufactured by Shinetsu Silicon K.K.) | 0.125 part |
| Epoxy-modified silicone oil (X-22-343, manufactured by Shinetsu Silicon K.K.) | 0.125 part |
| Toluene | 70 parts |
| Methyl ethyl ketone | 10 parts |

-continued

| | |
|---|---|
| Cyclohexanone | 20 parts |

Evaluation of the Ink Ribbon (1) Storage stability

The ink ribbon obtained as described above, was left to stand in an environment of a temperature of 40° C. under a relative humidity of 80%, whereby the surface of the ink ribbon was inspected, and the number of days until crystallization of the sublimable dye in the heat transfer layer was observed, was determined. The results are shown in Table 1.

(2) Recording density

The ink ribbon and the record paper obtained as described above were put together so that the heat transfer layer of the ink ribbon and the image receiving layer of the record paper were in contact with each other, and heat transfer was conducted under the following conditions by using a heat transfer printer equipped with a thermal head (KMT-85-6MPD2, partially glazed thin film type head, manufactured by Kyocera K. K.).

Immediately after the heat transfer, the density at the site corresponding to a current pulse width of 14 msec of the image formed by the transfer on the record paper, was measured by a reflective densitometer (Macbeth densitometer RD-918). The results are shown in Table 1.

Heat Transfer Conditions:

Voltage applied to the head: 11.2 V
Pulse width: 1.0–16.0 msec
Printing speed: 33.3 msec/line
Density: 6 lines/mm
Platen hardness: 70°
Platen diameter: 25 mm
Line pressure: 4 Kg/10 cm
Delivery speed: 5.0 mm/sec

EXAMPLES 2 TO 11 AND COMPARATIVE EXAMPLES 1 TO 6

A polyvinyl acetal resin was prepared in the same manner as in Example 1 except that the production conditions were changed as identified in Tables 1 and 2. The properties of the obtained resin are shown in Tables 1 and 2.

Further, in the same manner as in Example 1, an ink ribbon was prepared by using such a polyvinyl acetacetal resin, and its storage stability and record density were measured. The results are shown in Tables 1 and 2.

COMPARATIVE EXAMPLE 7

Into a reactor, 1,268 parts of pure water was introduced and 100 parts of the same PVA as used in Example 1 was added thereto and completely dissolved. Then, the temperature of the aqueous solution was maintained at 20° C., and 295 parts of 35% hydrochloric acid was added thereto. The temperature of the solution was lowered to 10° C., and 81 parts of acetaldehyde was gradually added under stirring, whereby white powder precipitated. Then, the reaction system was maintained at 35° C. for 6 hours. Then, washing with water and neutralization were conducted to obtain a polyvinyl acetacetal resin. The properties of the obtained resin are shown in Table 2.

Further, in the same manner as in Example 1, an ink ribbon was prepared using such a polyvinyl acetacetal resin, and its storage stability and record density were measured. The results are shown in Table 2.

COMPARATIVE EXAMPLE 8

An ink ribbon was prepared in the same manner as in Example 1 except that in the blend composition of the above dye composition used for the preparation of an ink ribbon in Example 1, 10 parts of a polyester type resin (SF Primer No. 750, manufactured by Dainippon Ink K. K., effective component: 30%) and 0.5 part of an isocyanate-type curing agent (effective component: 20%) were used instead of 3 parts of the binder resin, and its storage stability and record density were measured. The results are shown in Table 2.

COMPARATIVE EXAMPLE 9

An ink ribbon was prepared in the same manner as in Example 1 except that in the blend composition of the above-mentioned dye composition used for the preparation of an ink ribbon in Example 1, 3 parts of a polyamide-type resin (Milpecks 1000, manufactured by Henkel Hakusui K. K., softening temperature: 130°-150° C.) were used instead of 3 parts of the binder resin, and its storage stability and record density were measured. The results are shown in Table 2.

COMPARATIVE EXAMPLE 10

An ink ribbon was prepared in the same manner as in Example 1 except that instead of the polyvinyl acetacetal resin used in Example 1, a polyvinyl acetacetal resin having a composition comprising 4.7% of a vinyl alcohol moiety, 1.3% of a vinyl acetate moiety and 94.0% of an acetacetal moiety and having a weight ratio of the cis acetal moiety/trans acetal moiety of the acetacetal moiety of 0.8, an average degree of polymerization of 2,430 and a Tg of 120° C., was used, and its storage stability and record density were measured.

The storage stability of the above ink ribbon was 5 days, and the record density was 1.93.

TABLE 1

| | Production conditions[1)] | | | | Properties of the obtained polyvinyl acetacetal resins | | | | | Evaluation of the obtained ink ribbons (measured results) | |
|---|---|---|---|---|---|---|---|---|---|---|---|
| | Average degree of polymerization of PVA | Amount of hydrochloric acid (part) | Reaction time (hrs) | Amount of acetaldehyde (part) | Vinyl alcohol moiety (%) | Vinyl acetate moiety (%) | Acetacetal moiety (%) | Weight ratio of cis/trans of the acetacetal moiety | Tg (°C.) | Storage stability (days) | Recording density |
| Example 1 | 2430 | 15 | 6 | 125 | 8.5 | 1.3 | 90.2 | 2.7 | 113 | 9 | 2.78 |
| Example 2 | 2430 | 15 | 6 | 250 | 6.0 | 1.4 | 92.6 | 1.8 | 117 | 9 | 2.88 |
| Example 3 | 2430 | 12 | 5 | 320 | 5.6 | 1.3 | 93.1 | 2.1 | 117 | 9 | 2.85 |
| Example 4 | 2430 | 12 | 5 | 465 | 5.3 | 1.3 | 93.4 | 2.1 | 117 | 9 | 2.86 |
| Example 5 | 330 | 14 | 6 | 250 | 8.8 | 1.3 | 89.9 | 2.7 | 112 | 8 | 2.77 |
| Example 6 | 560 | 15 | 6 | 250 | 9.2 | 1.6 | 89.2 | 3.0 | 112 | 9 | 2.80 |
| Example 7 | 1740 | 15 | 6 | 280 | 8.6 | 1.4 | 90.0 | 2.6 | 112 | 8 | 2.82 |
| Example 8 | 2430 | 5 | 7 | 220 | 11.1 | 1.3 | 87.6 | 3.2 | 115 | 7 | 2.58 |
| Example 9 | 2430 | 10 | 7 | 250 | 9.0 | 1.3 | 89.7 | 2.3 | 113 | 9 | 2.84 |
| Example 10 | 2430 | 18 | 6 | 240 | 9.5 | 1.3 | 89.2 | 3.3 | 112 | 8 | 2.76 |
| Example 11 | 2430 | 15 | 3 | 280 | 7.3 | 1.5 | 91.2 | 3.5 | 115 | 8 | 2.55 |

[1)] The amounts of hydrochloric acid (35%) and acetaldehyde are amounts (parts) per 100 parts of PVA.

TABLE 2

| | Production conditions[1)] | | | | Properties of the obtained polyvinyl acetacetal resins | | | | | Evaluation of the obtained ink ribbons (measured results) | |
|---|---|---|---|---|---|---|---|---|---|---|---|
| | Average degree of polymerization of PVA | Amount of hydrochloric acid (part) | Reaction time (hrs) | Amount of acetaldehyde (part) | Vinyl alcohol moiety (%) | Vinyl acetate moiety (%) | Acetacetal moiety (%) | Weight ratio of cis/trans of the acetacetal moiety | Tg (°C.) | Storage stability (days) | Recording density |
| Comparative Example 1 | 2430 | 23 | 6 | 125 | 8.8 | 1.3 | 89.9 | 4.9 | 110 | 6 | 1.93 |
| Comparative Example 2 | 2430 | 10 | 36 | 125 | 8.2 | 1.4 | 90.4 | 4.6 | 110 | 6 | 1.95 |
| Comparative Example 3 | 2430 | 15 | 6 | 80 | 12.7 | 1.4 | 85.9 | 4.3 | 110 | 6 | 1.89 |
| Comparative Example 4 | 2430 | 2 | 6 | 225 | 23.2 | 1.6 | 75.2 | 5.7 | 108 | 3 | 1.52 |
| Comparative Example 5 | 2430 | 15 | 1 | 300 | 32.5 | 1.4 | 66.1 | 5.7 | 103 | Poor solubility in an organic solvent | |
| Comparative Example 6 | 2430 | 15 | 13 | 250 | 9.0 | 1.3 | 89.7 | 4.6 | 110 | 6 | 1.93 |
| Comparative Example 7 | 2430 | (Water-medium method) | | | 14.7 | 2.8 | 82.5 | 4.2 | 109 | 6 | 2.05 |
| Comparative Example 8 | Polyester-type resin (SF primer No. 750/isocyanate-type curing agent ratio = 10/0.5 | | | | | | | | | 4 | 1.12 |
| Comparative Example 9 | Polyamide-type resin (Milpeckes 1000) | | | | | | | | | 5 | 1.68 |

[1)] The amounts of hydrochloric acid (35%) and acetaldehyde are amounts (parts) per 100 parts of PVA.

EXAMPLES 12 TO 22

An ink ribbon was prepared in the same manner as in Example 1 except that 3 parts of the resin having the following composition was used instead of 3 parts of the binder resin in the blend composition of the dye-composition disclosed in the preparation of an ink ribbon in Example 1, and its storage stability and record density were measured. The results are shown in Table 3.

Composition of the Binder Resin

| | |
|---|---|
| Resin used in Example 1 | 100 parts |
| Resin (II) | Amount (parts) as identified in Table 3 |
| Resin (III) | Amount (parts) as identified in Table 3 |

As described in the foregoing, the heat transfer ink ribbon having a heat transfer layer using a binder resin for a heat transfer layer of the present invention consisting essentially of a polyvinyl acetacetal resin having a high acetacetalation degree and having a specific steric isomer structural ratio, or such a resin and a carboxy-modified polyvinyl acetal resin, is free from crystallization or bleeding of the dye from the heat transfer layer to the surface during the storage and excellent in the storage stability and yet is capable of providing an image record with an excellent recording density without prevention of sublimation and vaporization of the dye when heated by a thermal head for the heat transfer.

Further, the present invention provides an additional merit that at the time of preparation of a dye composition, the dispersibility of the dye is excellent and the storage stability and fixing properties of the heat transfer layer are improved.

TABLE 3

Resins combined with 100 parts of the resin used in Example 1 — Resin (II)

| | Properties: Composition (%): Vinyl alcohol moiety | Vinyl acetate moiety | Acetacetal moiety | Carboxyl group-containing unit moiety | Content of carboxyl groups (%) | Average degree of polymerization | Tg (°C.) | Amount (parts) |
|---|---|---|---|---|---|---|---|---|
| Example 12 | 14.7 | 2.3 | 75.4 | 7.6*1 | 4.9 | 1730 | 108 | 10 |
| Example 13 | 14.7 | 2.3 | 75.4 | 7.6*1 | 4.9 | 1730 | 108 | 25 |
| Example 14 | 14.7 | 2.3 | 75.4 | 7.6*1 | 4.9 | 1730 | 108 | 30 |
| Example 15 | 13.3 | 2.2 | 83.1 | 1.4*1 | 0.9 | 1760 | 110 | 25 |
| Example 16 | 12.5 | 2.4 | 78.9 | 6.2*1 | 2.4 | 1740 | 109 | 25 |
| Example 17 | 16.6 | 2.9 | 66.7 | 13.8*1 | 8.9 | 1730 | 107 | 25 |
| Example 18 | 12.9 | 2.4 | 81.6 | 3.1*2 | 2.6 | 2410 | 110 | 25 |
| Example 19 | 13.3 | 2.2 | 77.8 | 6.7*1 | 4.3 | 270 | 106 | 25 |
| Example 20 | 14.7 | 2.3 | 75.4 | 7.6*1 | 4.9 | 1730 | 108 | 12.5 |
| Example 21 | 14.7 | 2.3 | 75.4 | 7.6*1 | 4.9 | 1730 | 108 | 15 |
| Example 22 | — | — | — | — | — | — | — | 0 |

Resins combined with 100 parts of the resin used in Example 1 — Resin (III)

| | Properties: Composition (%): Vinyl alcohol moiety | Vinyl acetate moiety | Acetacetal moiety | Butyl acetal moiety | Carboxyl group-containing unit moiety | Content of carboxyl groups (%) | Average degree of polymerization | Tg (°C.) | Amount (parts) | Evaluation of the obtained ink ribbon (Measured results): Storage stability (days) | Recording density |
|---|---|---|---|---|---|---|---|---|---|---|---|
| Example 12 | — | — | — | — | — | — | — | — | 0 | 10 | 2.76 |
| Example 13 | — | — | — | — | — | — | — | — | 0 | 11 | 2.70 |
| Example 14 | — | — | — | — | — | — | — | — | 0 | 9 | 2.66 |
| Example 15 | — | — | — | — | — | — | — | — | 0 | 11 | 2.71 |
| Example 16 | — | — | — | — | — | — | — | — | 0 | 11 | 2.70 |
| Example 17 | — | — | — | — | — | — | — | — | 0 | 11 | 2.69 |
| Example 18 | — | — | — | — | — | — | — | — | 0 | 11 | 2.71 |
| Example 19 | — | — | — | — | — | — | — | — | 0 | 10 | 2.72 |
| Example 20 | 13.8 | 2.2 | 43.1 | 32.4 | 8.5*1 | 5.5 | 1720 | 91 | 12.5 | 10 | 2.66 |
| Example 21 | 13.8 | 2.2 | 43.1 | 32.4 | 8.5*1 | 5.5 | 1720 | 91 | 15 | 9 | 2.63 |
| Example 22 | 15.2 | 2.1 | 45.0 | 34.0 | 3.7*1 | 2.4 | 1740 | 92 | 25 | 8 | 2.60 |

*1 Acrylic acid units
*2 Maleic acid methyl ester units

As is apparent from the results shown in Tables 1, 2 and 3, ink ribbons of the respective Examples obtained by using binder resins for heat transfer layers of the present invention are excellent in the storage stability as well as in the record density, as compared with the Comparative Examples.

Further, in each Example, the dispersibility of the dye at the time of the preparation of the dye composition was excellent, and the storage stability and fixing properties of the heat transfer layer formed on the substrate were also excellent.

We claim:

1. A binder resin for a heat transfer layer, which consists essentially of a polyvinyl acetacetal resin (I) having an acetacetalation degree of at least 87% by weight, the weight ratio of cis-vinyl acetacetal moiety/trans-vinyl acetacetal moiety in the acetacetal moiety of the resin (I) being from 1 to 4.

2. The binder resin for a heat transfer layer according to claim 1, wherein the polyvinyl acetacetal resin (I) is obtained by an acetacetalation reaction of a polyvinyl alcohol resin and acetaldehyde in an organic solvent in the presence of an acid catalyst.

3. A binder resin as claimed in claim 1, wherein said polyvinyl acetacetal resin (I) has an average degree of polymerization of from 200 to 4,000.

4. A binder resin as claimed in claim 1, wherein said polyvinyl acetacetal resin (I) has an average degree of polymerization of from 300 to 3,000.

5. The binder resin as claimed in claim 1, wherein the weight ratio of cis-vinyl acetacetal moiety/trans-vinyl acetacetal moiety in the acetacetal moiety of the resin (I) is from 1 to 3.

* * * * *